Nov. 20, 1951 R. C. MATHES 2,575,910

VOICE-OPERATED SIGNALING SYSTEM

Filed Sept. 21, 1949 5 Sheets-Sheet 1

INVENTOR
R. C. MATHES
BY Harry C. Hart
ATTORNEY

INVENTOR
R. C. MATHES
BY Harry C. Hart
ATTORNEY

INVENTOR
R. C. MATHES
BY Harry C. Hart
ATTORNEY

INVENTOR
R. C. MATHES
BY Harry C. Hart
ATTORNEY

INVENTOR
R. C. MATHES
BY Harry C. Hart
ATTORNEY

Patented Nov. 20, 1951

2,575,910

UNITED STATES PATENT OFFICE 2,575,910

VOICE-OPERATED SIGNALING SYSTEM

Robert C. Mathes, Maplewood, N. J., assignor to Bell Telephone Laboratories, Incorporated, New York, N. Y., a corporation of New York Application September 21, 1949, Serial No. 116,979

12 Claims. (Cl. 179—16)

This invention relates to voice-operated devices, and particularly to the selective actuation of mechanisms in response to the vocal pronouncement of a command word. It has for its principal object to render such actuation independent of the phonetic characteristics which distinguish one individual speaker from another who pronounces the same word. Such apparatus may be employed in an automatic telephone exchange as a substitute for the present standard equipment which responds to the pulses generated by a finger dial.

It is known to analyze the sound of a spoken word into its harmonic components and, when these components adopt a particular preassigned energy distribution, to actuate a mechanism such as a relay in response to the presence of this distribution. Thus, for example, Dudley Patent 2,238,555 shows a system in which the preassigned distribution of the harmonic components is one which corresponds to a single "phonetic element," so called, i. e., one of a number of building blocks out of which it was once thought that all the words of the English language could be constructed. Repetition of this action for the next phonetic element, and for the next, and so on, causes individual phonetic element relays to be actuated in a certain particular sequence and this, in turn, actuates a word relay. Such systems are open to the criticism that the distribution of the components of the sound of a given phonetic element differs from one individual voice to another, so that the apparatus responds differently to different voices.

Recent work as described by Potter, Kopp and Green in "Visible Speech" (Van Nostrand, 1947) shows that there are very definite energy-frequency-time patterns corresponding to different words. These patterns delineate the movements on the frequency scale of the vocal cavity resonances as functions of time, i. e., as the word progresses from its inception to its termination. In the frequency range up to approximately 3000 cycles per second these patterns generally contain three significant resonances or "bars" which exhibit wide differences in shape and in location on the frequency scale from word to word. Such energy-frequency-time patterns, or "spectrograms," as they have come to be called, would serve well as standards or reference patterns for comparison with the corresponding components of an unknown word as spoken by an unknown voice, were it not for the fact that these spectrograms also exhibit variations from voice to voice for a given word. A study of the spectrogram patterns for a large number of words as spoken by widely different voices reveals the fact that the principal variations from voice to voice are of two kinds: an expansion or contraction along the time scale which is due to variations in talking speed, and a spreading or shrinking along the frequency scale which is associated with variations in the fundamental pitch of the voice. Both of these variations, taken together or separately, may be visualized as the result of imprinting the spectrogram of a word as spoken by a rapid, low-pitched voice onto a sheet of elastic material such as rubber, which is then stretched in either or both of two perpendicular directions. Stretching in one direction corresponds to drawing out the word in time, as with a slow talker. Stretching in the other direction corresponds to raising the resonance frequencies represented by the several bars. In this analogy all parts of the elastic sheet are proportionately stretched, whereas in the actual case the bars may be unequally shifted in frequency and the drawing out in time may be greater at one part of the word than at another.

Accordingly, it is a specific object of the invention to obscure the effects of reference pattern variations from voice to voice: in other words, to normalize the comparison process in frequency and in time, and to carry out these two kinds of normalization independently, and separately or together as required. This process, termed "normalization" in frequency and in time, involves modifying either the unknown signal or the reference standard signal. In the illustrative embodiments described below, frequency normalization is applied to the unknown while time normalization is applied to the standard. In brief, the sound of the unknown spoken word is analyzed and from this analysis signals are derived which are indicative of the frequencies of the several bars. At the same time a control signal is derived from the fundamental pitch of the voice, and this control signal is utilized to modify the several bar signals in reciprocal relation to the fundamental pitch, thus removing from the bar signals those variations which are associated with variations of pitch. The resulting frequency-normalized bar signals are then compared with standard reference space patterns in which the characteristics of a standard reference word are stored by virtue of the fact that the shapes of the space patterns, in rectangular or polar coordinates, are conformable to the shapes of the resonance bars of the standard word as spoken by a standard voice at standard speed. In one embodiment the comparison is made by deriving a standard time signal or pattern from each standard space pattern and balancing it on a time basis against the corresponding spoken word bar signal. In another embodiment the standard reference space pattern takes the form of a target path or maze while the frequency-normalized bar signal controls a cursor such as a cathode beam, which attempts to trace this path under the combined influence of the bar signal and an advancing force. In either case, unbalance or mismatch between the "standard" and the unknown modifies the speed of advance in a sense to minimize the mismatch. Thus in the case of the beam, its advance is accelerated or retarded as required, to enable it if possible to trace or track the target path from end to end. The acceleration and retardation of the advance of the beam or of the space pattern, as the case may be, are made to depend on the speed with which the matching process proceeds. Thus the reference standard is effectively normalized in time, and an "elastic time match" between it and the unknown word is achieved.

It is a feature of the invention that the individual resonances of the unknown voice are segregated and treated individually, even though for short intervals one such resonance may shift to a part of the frequency scale which is ordinarily occupied by another.

Other objects and features, and the manner in which they are realized, will be apparent from the following detailed description of illustrative embodiments of the invention, when considered in connection with the drawings, in which.

Figure 1:
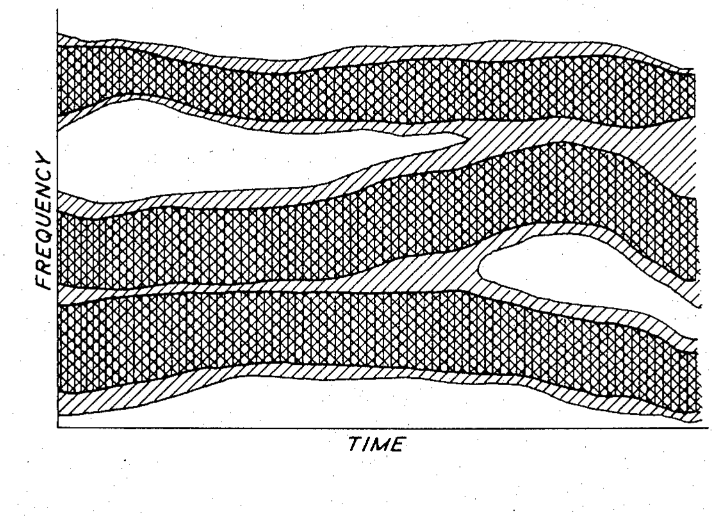
Fig. 1 is a part of a spectrogram of the word "Five"
Figure 3:
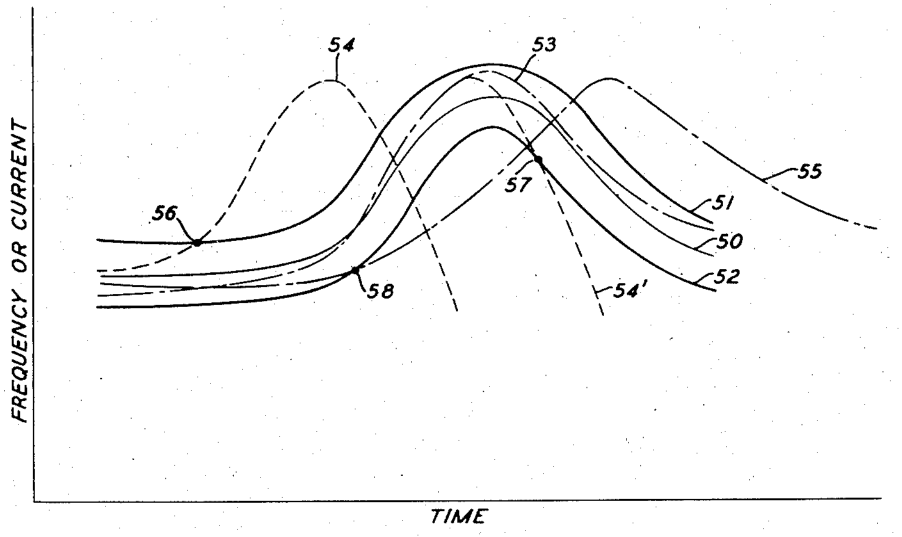
Figure 2:
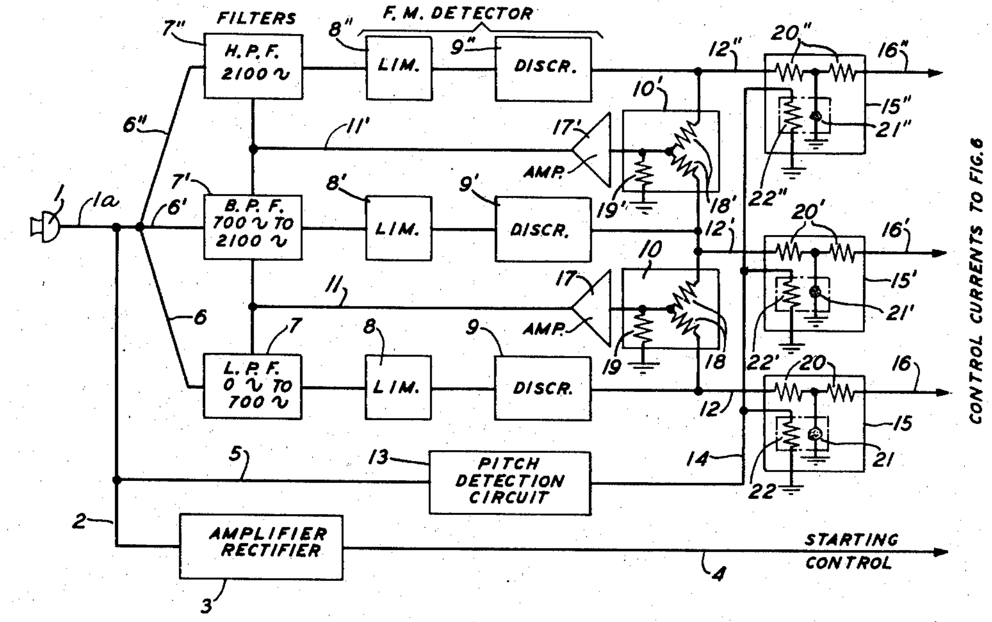
Fig. 2 is a block schematic diagram of a resonance analyzer including a correction circuit for the pitch of an individual's voice.
Figure 2A:
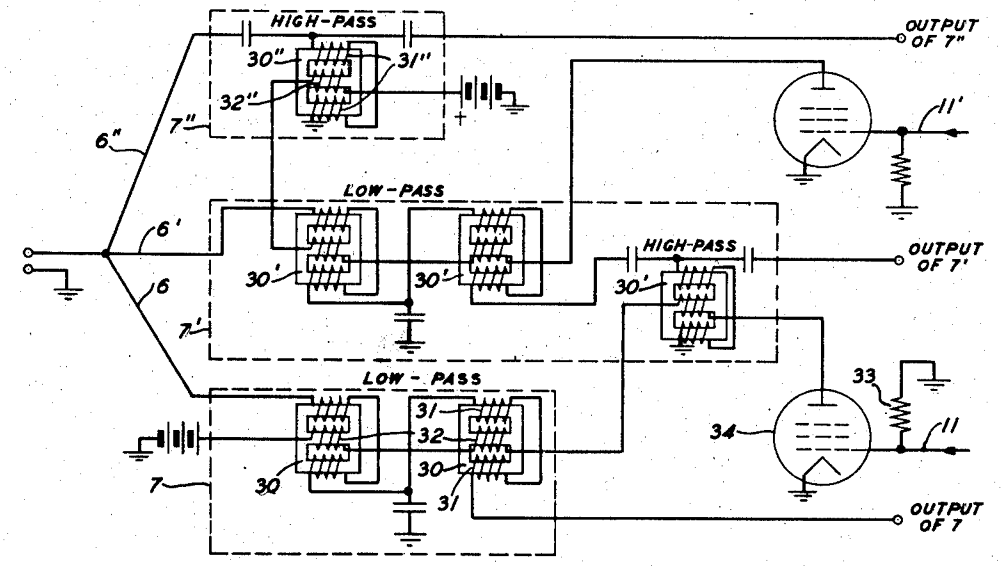
Figure 4:
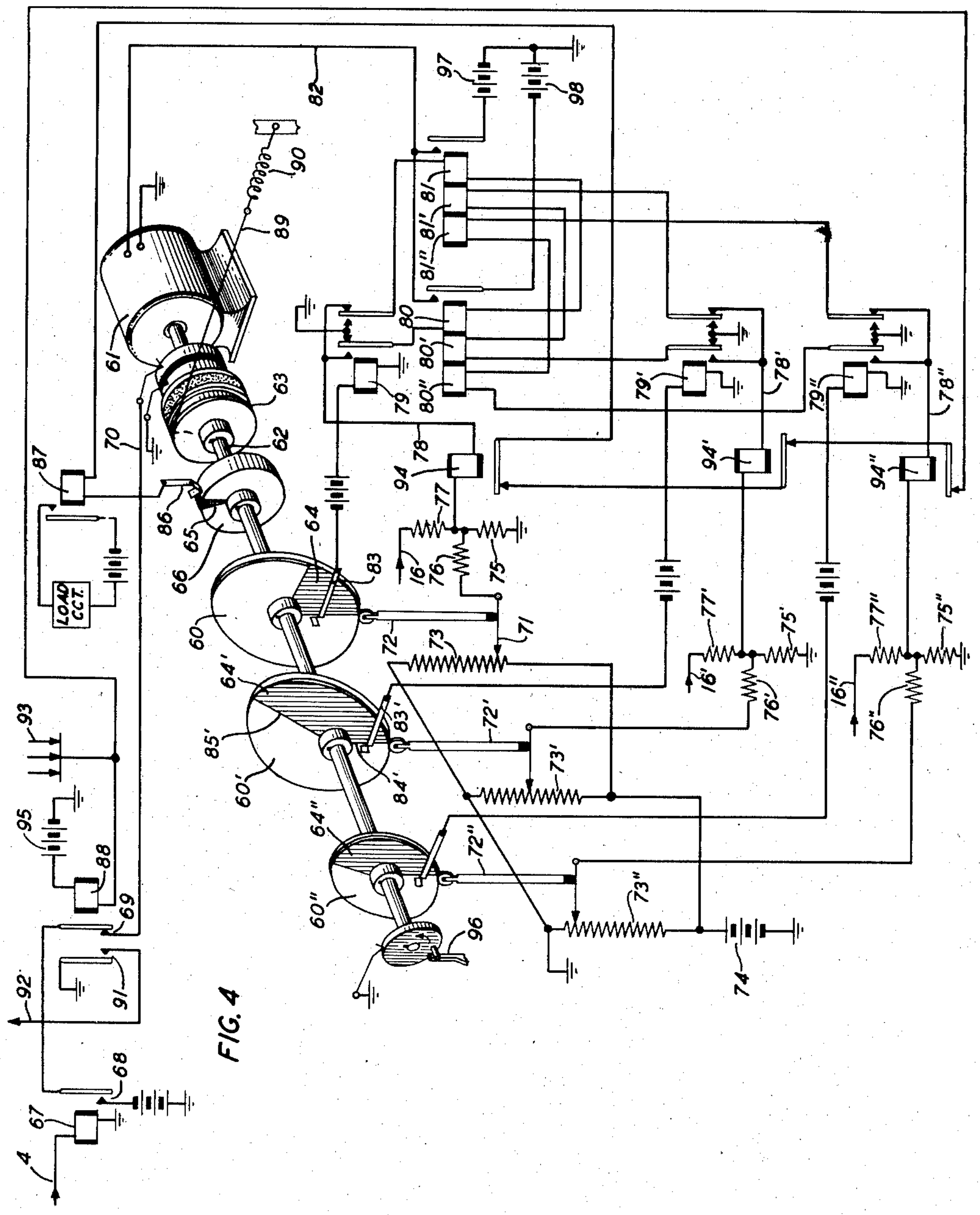
Figure 5:
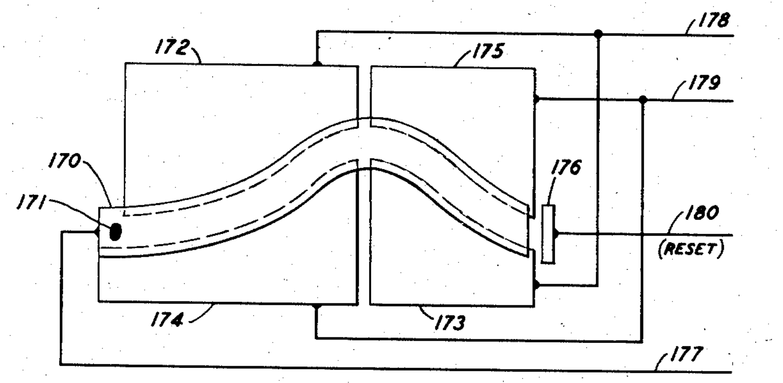
Figure 7:
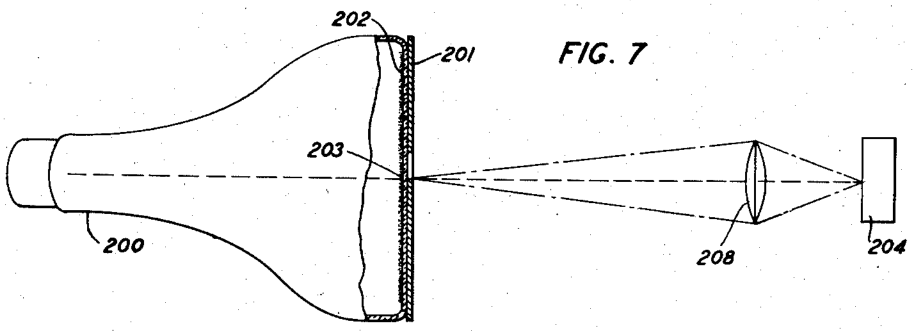
Figure 7B:
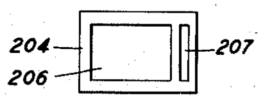
Figure 7A:
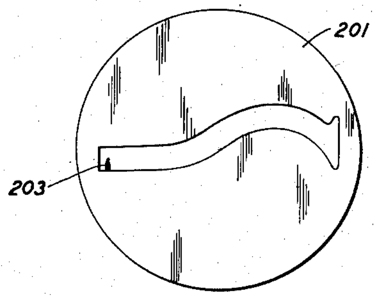
Figure 6:
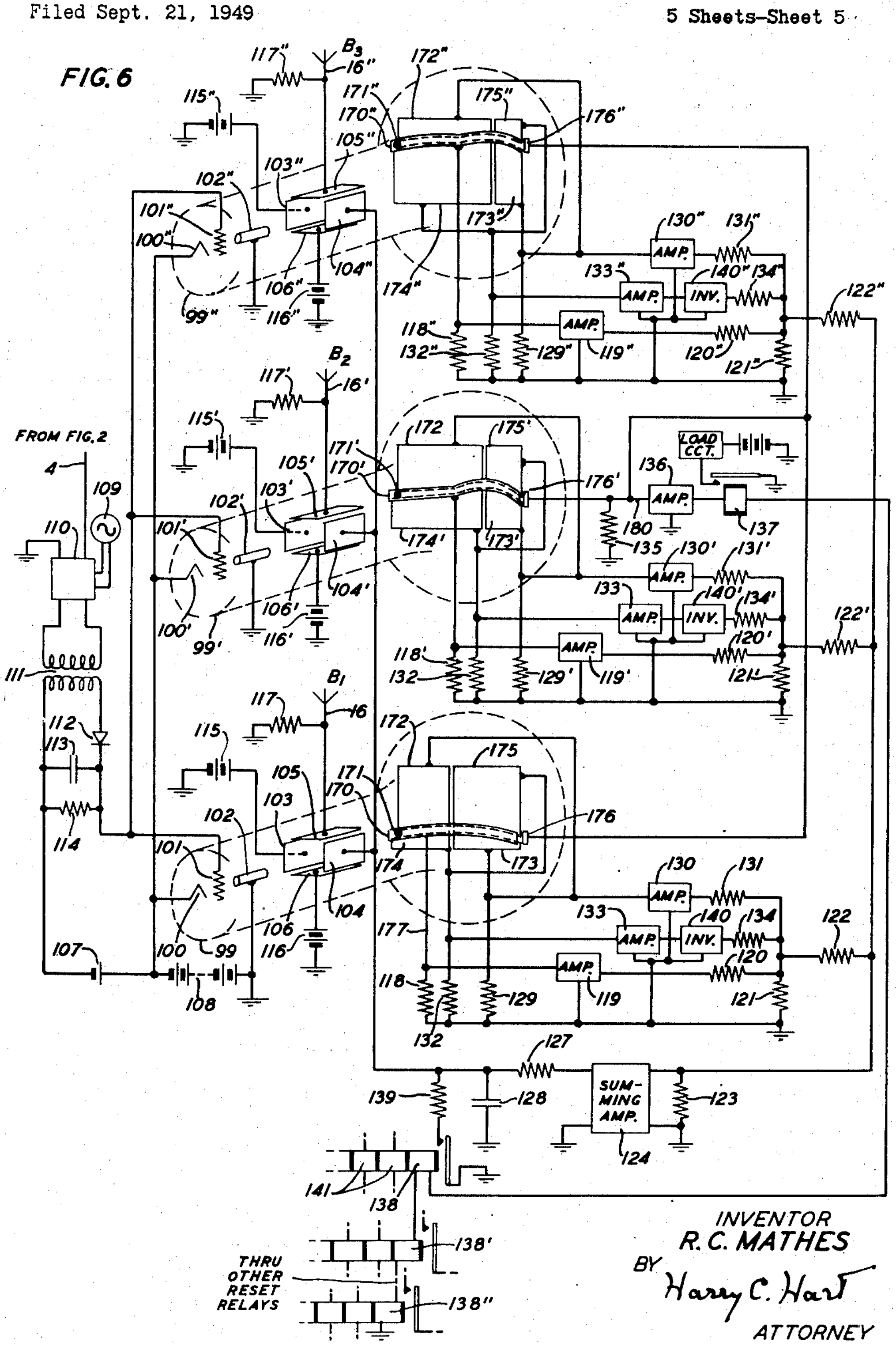

Fig. 2*a* is a schematic circuit diagram showing the details of parts of Fig. 2;

Fig. 3 shows on an enlarged scale the second bar of Fig. 1, together with other curves of faster or slower talkers used in explaining the method of operation for obtaining an elastic time match;

Fig. 4 shows in diagram form the use of a reference pattern for generating a reference current for matching purposes with the rate of generation controlled by feed-back circuits;

Fig. 5 illustrates the elastic time-matching principle as applied to targets in a cathode ray tube;

Fig. 6 shows in diagram form the use of a cathode ray tube with the specially shaped targets of Fig. 5 for comparing a spoken word with a fixed reference pattern and with feed-back circuits to provide for an elastic rate of matching;

Fig. 7 shows in diagram form how the equipment of Fig. 6 may be simplified by the use of a standard cathode ray tube and a photocell;

Fig. 7*a* is an end view of the tube of Fig. 7;

Fig. 7*b* is an end view of the photocell of Fig. 7; and

Figure 8:
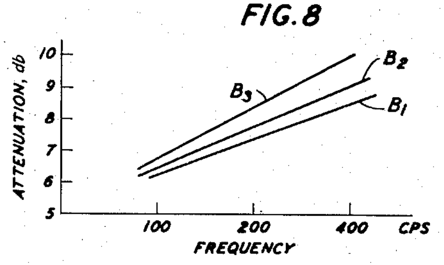

Fig. 8 shows the relation which holds between voice resonance bar frequencies and the fundamental pitch of the voice.

The sample analysis pattern shown in Fig. 1 as recorded by a sound spectrograph shows graphically how the areas of high energy, the dark areas, move about relative to the vertical frequency scale with the progress of time. From their appearance in these patterns these dark areas are called bar 1, bar 2, and bar 3 counting from the bottom. This particular analysis is for the voiced vowel sounds in the digit five.

The operation of the equipment may be regarded as taking place in two stages; first, the analysis of the incoming speech signal to derive certain control currents defining the bars of Fig. 1, and second, the use of these control currents in matching the characteristics of the incoming signal against standard reference patterns. The first of these operations is described in connection with Fig. 2, and the second in connection with Figs. 4 and 6.

In Fig. 2 speech energy originating, for example, in a telephone transmitter 1, appears on a lead 1*a*. Part of the speech energy is taken off over lead 2 to a standard amplifier-rectifier 3 such as is ordinarily used in echo-suppressors or volume control circuits. It provides a direct-current output over lead 4 to actuate a start control as will be explained below in connection with Fig. 4.

Part of the speech energy is taken over lead 5 to a pitch detection circuit 13. For the successful practice of this invention it will be sufficient if the pitch detection circuit produces a slowly fluctuating unidirectional voltage, the amplitude of which is at all times substantially linearly related to the fundamental frequency of the signal wave. Such pitch detecting circuits are well known and are shown, for example, in H. W. Dudley Patent 2,151,091.

The speech signal is also led over leads 6, 6' and 6'' to three filters 7, 7' and 7'', which nominally pass the bands 0 to 700 cycles, 700 to 2100 cycles, and above 2100 cycles. These are approximately the regions in which the first, second, and third resonances of the voice are most commonly found. As will be explained below, provision is made for shifting these division points to meet the exceptional variations from this general rule.

The outputs from these filters go in turn to the limiters 8, 8', and 8'' and the discriminators 9, 9' and 9'' which serve as frequency modulation detectors. The outputs of these detectors are slowly undulating unidirectional currents whose magnitude are proportional to the frequencies of the harmonic components of greatest amplitude in the several filter outputs, and hence measure closely the locations, on the frequency scale, of the resonance in the speech signal. Other standard forms of F. M. detectors, such as pulse counters or ratio detectors, may be used in place of the discriminators shown.

Parts of the outputs of the detectors 9 and 9' are combined in an adder 10 comprising buffer resistances 18 feeding currents through a resistor 19 and thus providing input voltage to an amplifier 17, whose output is fed back as a control current over lead 11. Likewise the outputs of the frequency modulation detectors 9' and 9'' are similarly combined in a similar adder 10' to provide a feedback control current over lead 11'. These control currents have amplitudes proportional to the average of the first and second voice resonance frequencies and to the average of the second and third voice resonance frequencies, respectively.

These control currents serve to modify the cut-off frequencies of the filters 7, 7', 7'', to take care of shifts of the voice resonances beyond the regions in which they are normally found. Thus the second resonance may occasionally fall below 700 cycles, in which case the first resonance is still lower. Or the first resonance may occasionally rise above 700 cycles in which case the second resonance is still higher. By employing the control currents to maintain each of the filter cross-over points at a value approximately equal to the average of the resonance locations, each group of resonance energies is sent to its proper F. M. detector. Similar considerations hold for the cross-over between the second resonance and the third.

There are a variety of means for varying the cut-off frequencies of the filters 7, 7', 7'' which select the three bands in which the three voice resonances are measured; i. e., for "tracking" these resonances. The means shown utilizes the control currents over leads 11 and 11' to vary the magnitudes of the inductances or capacities of the filters, or both. For the present purposes the requirements are very approximate and no great precision is required in the control. Fig. 2*a* shows an expanded diagram of that part of Fig. 2 which is concerned with the adjustment of these filters by control currents over leads 11 and 11'. A conveniently practical arrangement for the band pass filter 7' is to construct it of two filters in tandem, a high-pass filter having a nominal cut-off frequency of 700 cycles and a low-pass filter having a nominal cut-off frequency of 2100 cycles. Thus in Fig. 2*a*, filter 7 is shown as low-pass, one-section, mid-series-terminated filter consisting of two series arm inductances and one shunt arm capacitance, filter 7' as a similar low-pass filter in tandem with a high-pass, one-section, mid-series-terminated filter consisting of two series capacitances and one shunt inductance, and filter 7'' as a similar high-pass filter.

In all of these filters the reactance element which is varied by the control current is shown as the inductance element. Each of the elements comprises a ferro-magnetic core 30 bearing inductance windings 31 and a control winding 32. The control current over lead 11 passes through a resistor 33 in the input grid circuit of a pentode 34. The output current of the pentode 34 passing through this control winding 32 produces a varying direct-current magnetization in the whole core 30. As the magnetization approaches saturation, in the case of materials such as Permalloy, the effective permeability varies inversely as the square of the magnetizing current. Thus the inductance of windings on the outer arms of the core varies inversely as the square of the control current, and hence the filter cut-off varies in direct proportion to the current from the pentode, and hence, as the average location of the lower two resonance bars shifts toward higher frequencies the cut-off points of the low-pass filter 7 and the high-pass section of the filter 7' are shifted upward in proportion. Similiarly the high-pass filter 7'' and the low-pass part of the filter 7' move up or down on the frequency scale in direct relation to the average measured locations of the second and third resonance bars. No great precision is required in the control of these filter cut-offs, the only requirement being that the two sets of cross-overs lie between the two major resonances by pairs.

The inductance changes described above also result in changes in the filter impedances and therefore in reflection losses. With appropriate filter terminations these are of negligible effect. As a refinement, they may be compensated by controlled alteration of the capacitance values of the filter condensers, the capacitance variations being so correlated with the inductance variations as to hold the filter impedances constant. For this purpose any suitable voltage or current-controlled capacitance may be employed. The so-called reactance tube is a familiar example.

In addition to the direct method of control, the filter transmission band edges may be shifted by the well-known heterodyne methods of shifting the signal location with respect to a fixed filter by double modulation. In this process the speech signal frequencies are shifted as a side band on a carrier frequency by a balanced modulator up to some convenient region say around 15 or 30 thousand cycles, where a fixed filter is located. The cut-off point of this filter with respect to the signal frequencies is then readily shifted by changing the carrier frequency under the control of the feedback currents on leads 11 and 11'. Then by beating the signal back down to its original frequency band with the identical controlled carrier used to shift it up, it will appear as though the signal had passed through a variably controlled filter. This is the method commonly employed in many measuring instruments of the class known as frequency analyzers.

The discriminator outputs appearing on leads 12, 12' and 12'' are proportional to the magnitudes of the frequencies denoting the locations of the three major resonances in the speech signal. As already indicated, these are proportionately higher for a female voice than for a male voice, for a sound having the same meaning. To correct this discrepancy and to bring the output currents to a common standard for voices of different pitches, use in made of the output of the pitch detecting circuit 13. This is led over a lead 14 to the three variable attenuation pads 15, 15' and 15''. These pads may for example be simple T resistance pads with series arms of resistances 20, 20' and 20'' and with the shunt arms of four-terminal thermistors 21, 21' and 21'' through whose heater windings 22, 22' and 22'' the control current from the pitch detector 13 is passed. Due to the non-linear character of the thermistor resistance changes, practically any desired relation may be established between the current entering the pads 15 by way of leads 12, 12' and 12'' and those leaving the pads by way of leads 16, 16' and 16'' as a function of the control current which is in turn proportional to the fundamental pitch of the speech signal. The wide variations in these relations which are obtainable with thermistors are discussed in "Properties and Uses of Thermistors" by J. A. Becker, C. B. Green and G. L. Pearson, published in volume 26 of the Bell System Technical Journal, page 170 (January 1947). Experience shows that the variation in the third bar frequency is about thirty per cent for an octave increase in the fundamental pitch, the second and first bar variations being somewhat less. The necessary controls to compensate for these relations, which are depicted in Fig. 8, are easily obtainable with the aid of thermistors.

Accordingly, at the output of the circuit of Fig. 2 there are made available four control currents, a starting current and three control currents $B_1$, $B_2$, and $B_3$, proportional respectively to the resonance bar locations of the voice as normalized to a common standard pitch to allow for physical differences between talkers.

The method and means chosen to illustrate the performance of the final function of pattern matching may best be approached by referring to Fig. 3 for bringing out the kind of problem involved. For this purpose it is sufficient to consider the time pattern for a single resonance. The one selected corresponds approximately to bar two of Fig. 1. In this figure the abscissa is time and the ordinate is frequency (or the value of the control current proportional to it). The curve 50 may be taken as the average value of the resonance shift with time for a group of talkers who pronounce this word at a certain rate in time, e. g. the median. The curves 51 and 52 are the limit lines within which the patterns for all these talkers fall, the curve 53 being the frequency-time curve of this resonance for a particular one of these talkers contributing to the average. The area between curves 51 and 52 may thus be taken as a reference pattern for this particular reasonance in a particular word. Patterns for the other two resonances are similarly established.

The process now to be carried out is the matching of these patterns against the actual resonance curves of the currents generated by the analysis system of Fig. 2 from incoming speech. Two such curves are shown on Fig. 3 for the same word and resonance bar as that for which the curves 51, 52 define the reference pattern. The dotted curve 54 is for a rapid talker and the dot-dash curve 55 is for a slow talker. Both however are of the same shape as the pattern in the sense that successive amplitude changes follow each other in the same order in all three cases.

It is a feature of this invention that it provides a solution to the problem of matching the incoming pattern against the reference pattern by flexibly shifting the time scales of the two patterns with reference to each other in dependence on the degree and direction of mismatch encountered. The mismatch generates a control current which is fed back to accelerate or retard the rate of comparison.

Two systems are shown by which the rate at which the comparison is made may be varied. In the first of these the average value of the pattern is utilized to generate a current proportional to the ordinate of the pattern, and this current is balanced against or subtracted from the incoming signal current. While many physical means might be used for generating a reference current proportional to a graph such as the line 50 of Fig. 3, the first of these will be explained in terms of a simple mechanical illustration shown in Fig. 4. Cams 60, 60′ 60″ are driven by a shaft 62 coupled to a variable speed direct-current shunt-wound motor 61 through a magnetic friction clutch 63. The shape of the cam 60′ is simply a polar plot of the curve 50 of Fig. 3. The cams 60, 60″ are similarly shaped to the polar forms of the first and third resonance bars of Fig. 1. Also, each cam bears a contact-operating sector 64 for establishing the conditions of operation in the table explained below and a terminating contactor 65 set in insulating disk 66.

The operation of the apparatus is initiated by the starting control current on lead 4 from Fig. 2 which operates a relay 67 closing contact 68 which, by way of a normally closed contact 69 and a lead 70, actuates the magnetic clutch 63 and starts the shaft 62 rotating at the normal speed of the motor 61 which rotates continuously in one direction at a preassigned average speed. As the cam 60′ rotates, it drives a contact point 71′, by way of a push rod 72′, up and down a potentiometer 73′ supplied by a battery 74 with a steady current. At the same time push rods 72 and 72″ actuate potentiometers 73 and 73″ under the action of cams 60, 60″. All actions and circuits for the first and third resonance bars are indicated respectively by numbers unprimed and double-primed, and follow the actions exactly as described for the similar primed circuit elements for the second bar of Fig. 1.

The motion of the potentiometer contact point 71′ thus generates a reference current which bears the same functional relation to the angle through which the shaft 62 has turned as the ordinate of the curve 50 of Fig. 3 bears to its abscissa. This control current passes through resistor 75′ via resistor 76′. At the same time the signal control current to be identified, carried on the lead 16′ of Fig. 2 and is passed through the resistor 75′ via a resistor 77′ in such polarity that the voltage developed across the resistor 75′ is proportional to the difference between the incoming signal current and the reference current. This difference current passes over lead 78′ via the reversing switch contacts of relay 79′ through windings 80′ and 81′ of two marginal polar relays, each biased off-contact. At this point the three control currents are averaged, by virtue of the fact that the windings 80, 80′ and 80″ are all on the same relay, as are likewise the windings 81, 81′ and 81″. When the relay 80 operates, due to a sufficiently great average mismatch in one direction of the three reference currents as compared to the three incoming signal currents, a voltage of one polarity is carried from a battery 97 via lead 82 to an auxiliary field winding contained in the motor 61, causing it to increase its speed, and for an unbalance in the reverse direction the relay 81 operates, connecting a battery 98 of the opposite sign to the lead 82 and thus causing the motor speed to be reduced.

When the difference between the two currents exceeds the amount represented by the curves 51 and 52, one of the marginal relays 80 or 81 is operated and the rate of generation of the reference current is accordingly altered. The direction in which the rate of generation is to be altered may now be seen by referring to Fig. 3. It will be seen that for a rapid talker the curve 54 intersects the upper limit curve 51 at a point 56 where the slopes of the curves are positive; and this calls for increasing the rate of generation of the reference current to make for a better possibility of match between it and the incoming voice current. Also, later on when the slopes of the curves have become negative (the relative position of the first talker's curve being now indicated by 54′) the intersection at point 57 with the lower limit curve 52 indicates that the reference current must be generated at a faster rate. For the case of the slow talker the conditions for maintaining a match are just the reverse of these, as when the slopes of the curves are positive they would intersect the lower limit curve 52 as at a point 58, indicating that a reduction of the rate of generation of a current proportional to the reference pattern is concerned we have the following set of conditions:

| Intersect | Positive Slope | Negative Slope |
|---|---|---|
| Upper limit | Accelerate motor | Decelerate motor. |
| Lower limit | Decelerate motor | Accelerate motor. |

As noted in the table of operating conditions above the function of increase or reduction of speed is reversed accordingly as the slope of the reference pattern curve is positive or negative at the mismatch point. This function is taken care of by the metallic sector 64′ mounted on the side of the cam 60′ and making contact with a wiper 83′ during that part of the revolution in which the slope of curve 50 on Fig. 3 is negative. That is, the edges 84′, 85′ of the sector 64′ lie along radii of the cam 60′ which mark the boundaries between the regions of positive and negative slope of the cam. When the cam has rotated so far that the edge 85′ is opposite the push rod 72′ and hence the push rod has reached its greatest travel, the sector 64′ makes contact with the wiper 83′ and, by operating the relay 79′, reverses the polarity of windings 80′ and 81′ upon their respective relays. Thus the operating conditions of the table are carried out.

In case a resonance bar should have two or more maxima or minima instead of a single one as in Fig. 3, the corresponding angular areas of the cams may be provided with conductors 64 in greater numbers, accordingly.

If the shapes of the three incoming signal control currents, when thus elastically matched in time against a particular set of reference currents, permit one complete rotation of the shaft 62 in the speaking time of one word of the vocabulary the system is designed to recognize, then the contact 65 set in the insulating disk 66 makes contact with a wiper 86, thus completing the circuit of a battery 95 through the windings of relays 87 and 88, and through the contacts of relays 94, 94′ and 94″, to ground, and so actuating relays 87 and 88. Actuation of the load relay 87 closes a contact which permits the operation of the function desired corresponding to the particular word of the vocabularly, such for example as setting up a register in an automatic telephone exchange.

The actuation of the reset relay 88 opens the contact 69 in the circuit of the magnetic clutch 63, uncoupling the shaft 62 from the driving motor 61. During the rotation of the shaft, a tape 89 has wound up for one revolution on the outer face of the left hand member of the magnetic clutch against the pull of a coiled spring 90. Upon the release of the magnetic clutch 63, all three of the cams 60, 60′, 60″ are restored to their starting positions, determined by a limit stop 96, by the action of the spring 90, and the equipment is again ready to check for a match against another incoming word.

When the direction of mismatch is such that the motor is accelerated and the shaft completes one complete revolution ahead of the correct identification of the word being identified, the relays 94, 94′, and 94″ are provided to prevent the registration of a false identification and reset by this circuit. In this situation at least one of the three currents passing through the relays 94, 94′ or 94″ will have a value greater than the marginal operating current of these relays. Hence the operating circuit through relays 87 and 88 will be opened and the closing of contact 65 to wiper 86 will be ineffective. In this case the system will be reset by a ground via one of the leads 93 from one of the other identifying equipment which correctly identifies this word.

Apparatus as above described is provided for each word of the designed vocabulary, and when any one of them has successfully matched the incoming signal, all must be reset for the next one. This is accomplished by the auxiliary contact 91 on the reset relay 88 which places a ground via lead 92 on the windings of each of the reset relays 88 on all the other equipments. The corresponding cross connections from all the other equipments are indicated by the multiple arrow heads 93 coming in to place a ground on this relay 88.

As previously stated this mechanical cam is only one physical means of generating a current proportional to the reference graph for carrying out the matching function. Electronic means could equally well be used to generate a current having the required functional relations, for example in the manner shown in Sunstein Patent 2,461,667. In that case the control circuits may be applied to vary the speed of the sweep of a cathode beam as in this illustration they vary the speed of the motor.

In an alternative system for controlling the rate of comparison, a fixed reference space pattern is utilized as marked out by the lines 51 and 52 of Fig. 3, and an indicator is moved over this pattern under the control of the incoming speech signal current from each of the frequency detectors of Fig. 2 for the vertical dimension and under the control of a variable driving rate for the horizontal dimension. While it is possible to construct such a system of mechanical elements, in this instance the invention will be illustrated by preferred systems employing electronic elements.

The central element of the electronic system is shown in Fig. 5 as comprising a target plate 170 in a cathode ray tube as the fixed reference space pattern upon which an electron beam 171 impinges as the moving indicator. The beam cross section might be of conventional circular form but may preferably be of the elongated form as indicated by the spot 171. The target 170 is shown as having the form of the reference pattern between lines 51 and 52 of Fig. 3. Back of the target plate 170 are four auxiliary target plates 172, 173, 174 and 175 upon which the beam impinges if it fails to follow the pattern of plate 170 as it is swept across. Reference to Fig. 3 will again show that if the rate of sweep is too slow the electron spot will leave the pattern plate to strike upon plates 172 or 173 and if the rate of sweep is too fast it will impinge on plates 174 or 175. Hence plates 172 and 173 are connected together and the electron current drawn from them is taken out over a lead 178 to provide a feedback current for accelerating the beam sweep and plates 174 and 175 are connected together to provide a feedback current sweep via a lead 179 for reducing the speed of sweep. The fact of the presence of the spot 171 upon the target 170 at the beginning of the sound to be tested provides an electron current via lead 177 for setting the normal rate of sweep of the spot across the pattern. If the spot is initially too low it will be subjected to only a retarding force from the speed-reduction control over lead 170. Plate 172 is shown cut away for a short distance at the left so that if the spot is initially well above the pattern it will not receive a speed up control via lead 178. In fact, in one form of the invention as described below in connection with the complete circuit of Fig. 6, plates 172 and 173 may be omitted entirely. The final element in Fig. 5 is a small target 176 which the electron beam strikes if it successfully threads the maze set by the pattern plate. The electron current from this target is led out via lead 180 marked "reset" as it serves to indicate the successful matching to this pattern and to reset all matching devices for the next word of command.

The pattern-matching operation will now be explained with reference to Fig. 6 in which the elements of Fig. 5 are shown similarly numbered as the targets in a cathode ray tube whose other elements are an enclosing envelope 99, a cathode 100, a control electrode 101, an accelerating and focusing electrode 102, horizontal deflection plates 103 and 104, and vertical deflection plates 105 and 106. In matching patterns for a word, three structures of this kind are used, as the shapes of all three resonance patterns for a given word must be substantially matched by an incoming signal for its identification. This may be done with three separate cathode ray tubes or, if preferred, three of these structures may be built into a single tube. The three plate patterns shown correspond to the bar patterns of Fig. 1. The description will be given in respect to one structure, it being understood that similar operations take place with the remaining two, corresponding elements being indicated by primed and double-primed reference numerals.

When there is no speech signal being analyzed the control elements 101 are biased to a negative potential by a battery 107, no beam current flows and nothing happens. Action is initiated by the starting current from Fig. 2 on lead 4 producing a positive potential on control grids 101. As this part of the circuit is at a high negative potential due to the accelerating battery 108 of the beam tube, it must do this by indirect means. The control current coming in on lead 4 is used to modulate any convenient source 109 of high frequency energy, by a carrier-elimination modulator 110. The resulting alternating-current signal is transmitted by a well insulated transformer 111, after which it is rectified by rectifier 112 and smoothed by a condenser 113 to produce a positive potential on the electrodes 101 across a resistance 114. Each of the electron beams, now permitted to pass, reaches the target elements at their left side due to the positive potential applied to the horizontal deflection plate 103 by the battery 115, and is drawn to the bottoms of the target array by the potential of a battery 116 applied to the vertical plate 106.

If at the same time the control current $B_1$ coming by way of lead 16 from the analyzer apparatus of Fig. 2, which represents the location of the first resonance, has the right value for this pattern, it establishes a potential across a resistor 117 which brings the beam up by the action of vertical deflection plate 105 until the spot 171 strikes the pattern target 170 at its left end.

The electron beam current collected by the pattern target 170, passing through a resistor 118 to ground, provides an input potential to a direct-current amplifier 119 whose output current passes by way of a buffer resistance 120 through the common resistance 121 and to ground. The resulting potential is further passed along through resistances 122 and 123 to provide an input to a summing amplifier 124. This amplifier is biased to give zero output current until a positive potential is applied to its input. When such potential is applied a proportional current flows through a large resistance 127 into a condenser 128. The output of amplifier 124 as its appears across the condenser 128 provides the horizontal deflection potential to plate 104 and also to the similar plates of the other structures for resonance patterns 2 and 3. The time constant of the resistor 127 and the condenser 128 is set so that for the duration of a single matching the voltage on condenser 128 rises linearly with the product of current by time. Thus for a constant input to amplifier 124, the rate of sweep is constant. Similar inputs come by way of resistances 122′ and 122″ from the other two pattern targets 170′, 170″ for the other two resonances. If all three spots fall substantially on the three targets then the total resulting deflecting potential may be adjusted to drive the three spots across their respective patterns at a rate corresponding to the normal rate of speaking the word in question.

Now, as already explained in connection with Figs. 3 and 5, if the talker is pronouncing the particular word at a rate faster than average the beam will move upward at a rate which carries it upward and onto the plate 172 whose output is now fed by way of the lead 178 through resistance 129 to ground, providing an input to a direct-current amplifier 130. The output of the amplifier 130 is adjusted by its buffer resistance 131 to make a much larger contribution to the input of amplifier 124 than the contribution of the amplifier 119. Hence the sweep will be accelerated and the spot will in fact travel along impinging partly on the pattern target 170 and partly on the back target 172.

If, however, the word is being spoken more sluggishly than normal, then the spot will go off the target 170 at its lower boundary and part of the beam current will go to ground through resistance 132 to provide an input to a direct-current amplifier 133. This amplifier has its output inverted, by an inverter stage 140, as compared with amplifiers 119 and 130. Hence its output subtracts from the input to the amplifier 124 and the rate of sweep is reduced. The spot then travels along partly on the pattern plate 170 and partly on the back plate 174, the degree of division of the spot being set by the relative magnitudes of the output buffer resistances 120 and 134.

As previously explained in connection with Figs. 3 and 5, the action required is reversed when the spot intersects with a negatively sloping boundary as compared with a positively sloping one. Hence back plate 175 is connected to back plate 174, so that either of them produces deceleration. Similarly, back plates 173 and 172 are interconnected so that either of them produces acceleration. If the resonance bar should have two or more maxima or minima, the back plates may be increased in number, and interconnected accordingly.

By changing the relative magnitudes of resistances 122, 122′ and 122″ it is possible to weight the contributions of the three tracking controls to the final sweep rate so that more importance may be given to one resonance pattern than to another in identifying a particular word. Thus for example, resonance number three for certain words may be less constant in its characteristics from talker to talker than number one or number two, and thus may be given less weight in the feedback control.

One equipment as described in Fig. 6 is needed for each word in the command vocabulary and all may be supplied simultaneously with the necessary control currents from the circuit of Fig. 2. All will try to go into action at once when one of the command words is spoken. Some will not start hunting across the pattern at all as no spot will fall on any one of the reference patterns, while others may start slowly if one or two spots match initially. Of these, most will stall part way across as the spot will be unable to follow their patterns all the way across because the order of relative magnitudes of the fixed patterns are in different sequence than are those of the incoming speech signal. With a suitably selected vocabulary, however, only one set of spots will traverse the whole pattern and the spots of this set will strike the targets 176, 176′, 176″. The beam currents passing to ground through resistance 135 then provide an input to a direct-current amplifier 136 whose output operates a load relay 137 and a group of reset relays 138, 138′, 138″. In some cases the mismatch may be such that the spots are swept at the accelerated rate to the end of the targets without holding a match. The margin of operation for relay 137 is set so as to operate only if beam current flows from all three of these targets. Hence if the beams are swept to the end of the targets without a match, relay 137 will not operate and hence an incorrect identification will not be given. The operation of the load relay 137 provides a contact closure in a local operating circuit which leads to the operation of any desired apparatus as required by the particular word in question. The group of reset relays 138′, 138″ etc. consists of one in each identifier corresponding to relay 138 whose operation discharges the condenser 128 through a relatively low resistance 139. Correspondingly, relay 138 is operated by auxiliary windings 141 by other identifier circuits. This restores all tubes to their original conditions and the equipment is ready to receive the next word of command. Thus, even if two words are run together with continuous voicing, as soon as the first is identified the equipment is in readiness to proceed with the identification of the second. Where a single word is broken in the middle as by a stop consonant, it may be identified as two words, a pattern target being provided, along with associated circuits, for each half of the word. For many purposes it is possible to use vocabularies of words not so broken. Thus the vocabulary "oh, one, two . . . nine" contains only one such broken word; and this vocabulary suffices for a voice-operated telephone switching system.

The foregoing description has been given for the sake of generality, in terms of an embodiment which both accelerates and decelerates the speed of comparison. In some cases it will be possible to simplify the equipment and circuits by a relatively simple expedient which will next be described.

Suppose the outputs of the amplifiers connected to the pattern plates (amplifiers 119 and plates 170 in Fig. 6) are set so that the rate of sweep established by them is somewhat greater than that required by the fastest talker. Then the only action required by a mismatch is to reduce the rate of sweep. This will occur automatically as the spot crosses the edge of the target due to the diminution of the amount of current to the target. A back plate may be used merely to drain off to ground that fraction of the beam current which misses the pattern plate. Back plates 172, 173, 174, and 175 and all their associated amplifiers and circuits may now be omitted. To facilitate the easy production of a range of sweep rates without hunting it is desirable, though not necessary, to have a beam spot which is elongated vertically. Electron-optical systems for generating such a beam are well known. Or, the same effect may be secured by inserting a sawtooth source of high frequency in series with the bias on vertical deflection plate 106 which serves to oscillate the spot vertically over a small distance, say about one-fourth to one-half the pattern plate width.

This mode of operation makes possible a still further simplification in the apparatus as illustrated in Fig. 7. The special tube structure illustrated may be replaced by a standard cathode ray oscilloscope tube 200 of small size, having an internal fluorescent screen 201 and an external opaque mask 202 placed over the end, of which a front view is shown in Fig. 7A. This mask is provided with a cut out or open space of the same shape as the pattern matching plate 170 of Figs. 3 and 6. The light of the spot 203, caused by impact of the cathode beam on the screen 201, is focused by lens 208 on a photoelectric cell 204 which takes the place of the resistance 118 as the input to the amplifier 119 of Fig. 6, amplifiers 130 and 133 now being omitted from the circuit. This modified circuit now operates as for the single target plate. A front view of the photocell 204 is shown in Fig. 7B to have two electrically separate photosensitive areas 206 and 207. Light focused on the area 206, when the beam appears in the slot in the mask 202, provides the driving potential for the scanning over the greater part of the length of the slot. When the beam reaches the end of the slot, shown somewhat widened beyond the normal pattern to provide positive operation, the light is focused on area 207 which takes the place of target 176 in Fig. 6. Area 207 is connected into the circuit of Fig. 6, in place of resistance 135 to provide the input to the amplifier 136 for establishing the reset impulse. In all other respects the circuit operates as described in connection with Fig. 6.

Various other modifications will occur to those skilled in the art.

What is claimed is:

1. In a voice sound identifying system, in combination with a source of an unknown complex signal having a multiplicity of different frequency components, apparatus for identifying said signal which comprises means for deriving from said components a pattern representative of the frequencies of energy maxima of said signal, a reference pattern similarly representative of the energy maxima of a standard signal, means for progressively comparing said first-named pattern with said reference pattern at a standard speed, means for deriving a mismatch signal from said comparison, and means under control of said mismatch signal for varying the rate of comparison.

2. In a voice sound identifying system, a source of a signal which is an electrical counterpart of the complex wave form of a spoken word and which has a multiplicity of different frequency components, means for deriving from said components a pattern indicative of the frequencies of energy maxima of said signal, a reference pattern similarly representative of the energy maxima of a standard signal, means for progressively comparing said first-named pattern with said reference pattern at a standard speed, means for deriving a mismatch signal from said comparison, and means under control of said mismatch signal for varying the rate of comparison.

3. In a voice sound identifying system, a source of a signal which is an electrical counterpart of the wave form of a spoken word, means for deriving from said signal a time pattern representative of the energy-frequency-time behavior of a voice-resonance of said word, a space pattern which is similarly representative of the behavior of the corresponding resonance of said word as spoken by a standard voice at standard speed, a pattern-tracing element, means for advancing said element along the time-dimension of said space pattern at an average speed, means for deflecting said element along the frequency dimension of said space pattern under control of said time patterns, means for deriving a correction signal from departure of said tracing element from said space pattern, means for modifying rate of advance of said element under control of a departure of said element from said space pattern, and means responsive to a passage of said element from end to end of said space pattern for generating an identification signal.

4. In combination with a signal source, apparatus for identifying an unknown signal of said source which comprises a cathode beam tube having an electron gun and a target having the configuration of a standard reference signal in frequency-time coordinates, means for sweeping the beam along the target in the direction of the time coordinate at a variable speed, means for deflecting the beam across the target in the direction of the frequency coordinate under control of said unknown source signal, means for deriving a correction signal from departure of the beam from the target, connections for applying said correction signal to said beam-sweeping means to vary the speed of sweep, and means responsive to tracking of said target by said beam from end to end of said target for generating an identification signal.

5. In a voice-operated system, means for analyzing the progressive sound of a spoken word into groups of harmonic components, means for selecting a principal one of said components, the frequency of said principal component changing continuously, a cathode beam tube having an electron gun and a target having a configuration related to the frequency of the corresponding component of a standard word as spoken by a standard voice at standard speed, means for sweeping the beam along the target in one direction at a variable speed, means for deflecting the beam across the target in another direction under control of the principal spoken word component, means for deriving a signal from departure of the beam from the target, connections for applying said signal to said beam-sweeping means to vary the speed of sweep, and means responsive to tracking of said target by said beam from end to end of said target for generating an identification signal.

6. In a voice-operated system, means for analyzing the progressive sound of a spoken word into groups of harmonic components, means for selecting a plurality of said components of high energies, the frequencies of said components changing continuously, means for mutually isolating said selected components, a plurality of cathode beam tubes each having an electron gun and a target having a configuration related to the frequency of one of said components of a standard word as spoken by a standard voice at standard speed, means for sweeping the several beams along the several targets in one direction at a variable speed, means for deflecting each of the beams across its target in another direction under control of one of the selected components, means for deriving a signal from departure of each beam from its target, means for averaging said derived signals, connections for applying said signals as averaged to said beam-sweeping means to vary the speed of sweep, and means responsive to tracking of said targets by said beam from end to end of said targets for generating an identification signal.

7. Signal recognition apparatus which comprises a source of an unknown signal, a cathode beam tube having an electron gun, a target having a configuration related to a desired characteristic of a standard signal as generated at a standard speed, means for sweeping the beam along the target in one direction at a variable speed, means for deflecting the beam across the target in another direction under control of said unknown signal, means for deriving a control signal from departure of said beam from said target, connections for applying said control signal to said beam-sweeping means to vary the speed of sweep, and means responsive to tracking of said target by said beam from end to end thereof for generating an identification signal.

8. Signal recognition apparatus which comprises a source of an unknown signal, a cathode beam tube having an electron gun, a target having a configuration related to a desired characteristic of a standard signal as generated at a standard speed, means for sweeping the beam along the target in one direction at a variable speed, means for deriving a sweep-potential from impact of said beam on said target, means for applying said potential to said beam-sweeping means to generate a sweep of average speed, means for deflecting the beam across the target in another direction under control of said unknown signal, means for deriving a control signal from departure of said beam from said target, connections for applying said control signal to said beam-sweeping means to vary the speed of sweep, and means responsive to tracking of said target by said beam from end to end thereof for generating an identification signal.

9. Signal recognition apparatus which comprises a source of an unknown signal, a cathode beam tube having an electron gun, a principal target having a configuration related to a desired characteristic of a standard signal as generated at a standard speed, auxiliary targets disposed at the boundaries of said principal target, means for sweeping the beam along the principal target in one direction at a variable speed, means for deflecting the beam across the principal target in another direction under control of said unknown signal, means for deriving a sweep-retarding signal from impact of said beam on a forward boundary target, means for deriving a sweep-accelerating signal from impact of said beam on a rearward boundary target, means for applying said retarding signal and said accelerating signal to said beam-sweeping means to vary the speed of sweep accordingly, and means responsive to tracking of said principal target by said beam from end to end thereof for generating an identification signal.

10. In a voice sound-identifying system, a source of a complex signal which is an electrical counterpart of the wave form of a spoken word and which has a plurality of different frequency components, means for deriving from said components a time pattern indicative of the energy-frequency-time relations of a principal voice resonance of said spoken word, a space pattern conforming to the energy-frequency-time diagram of a corresponding resonance of said word as spoken by a standard voice at a standard speed, means for advancing said space pattern at an average speed, means for deriving from movement of said space pattern a standard time pattern proportional thereto, means for comparing said spoken word time pattern with said standard time pattern to derive a mismatch signal, means for varying the speed of advance of said space pattern under control of said mismatch signal, and means responsive to movement of said space pattern through its full length, without the derivation of a mismatch signal in excess of a preassigned threshold value, for generating an identification signal.

11. In combination with a source of a complex signal characterized by a plurality of different frequency harmonic components, apparatus for identifying said signal which comprises a relatively small number of filters having contiguous pass bands which together cover the frequency range of said signal, each such pass band being bounded by an adjustable cut-off frequency, said filters having input terminals connected in parallel to said source, each of said filters having an output terminal, a discriminator connected to the output terminal of each filter for deriving a control signal which bears a preassigned relation to the frequency of an energy maximum of those components of said complex signal which are passed by the filter to which it is connected, and means for adjusting said cut-off frequencies by said control signals in a sense to maintain one of said energy maxima approximately centered in each of said pass bands.

12. In combination with a source of a complex signal characterized by a plurality of different frequency harmonic components of variable energy distribution, apparatus for maintaining the identity of the several energy maxima of said distribution which comprises a number of filters having contiguous pass bands which are adjustable on the frequency scale and which together cover the frequency range of said signal, the number of said filters being equal to the number of distinct energy maxima normally present in said signal, said filters being supplied in parallel by said source, a frequency-responsive element coupled to each filter, means for deriving an output signal from each frequency-responsive element, means for averaging the output signals of adjacent frequency-responsive elements by pairs to derive control signals, and feedback means for adjusting the cut-off point separating the pass bands of two contiguous filters by the control signal derived from said two filters.

ROBERT C. MATHES.

REFERENCES CITED

The following references are of record in the file of this patent:

UNITED STATES PATENTS

| Number | Name | Date |
|---|---|---|
| 2,151,091 | Dudley | Mar. 21, 1939 |
| 2,238,555 | Dudley | Apr. 15, 1941 |
| 2,293,203 | Gosmann | Aug. 18, 1942 |
| 2,413,263 | Suter | Dec. 24, 1946 |